US006882120B2

(12) United States Patent
Yokomori

(10) Patent No.: US 6,882,120 B2
(45) Date of Patent: Apr. 19, 2005

(54) POWER DEVICE FOR VEHICLE SLIDING DOOR

(75) Inventor: Kazuhito Yokomori, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/611,642

(22) Filed: Jul. 2, 2003

(65) Prior Publication Data

US 2005/0001568 A1 Jan. 6, 2005

(30) Foreign Application Priority Data

Jul. 2, 2002 (JP) ....................................... 2002-194014

(51) Int. Cl.[7] ................................................ H02D 1/54

(52) U.S. Cl. ............................ 318/55; 318/56; 318/57; 378/443; 378/445

(58) Field of Search ............................ 318/55, 56, 57, 318/443, 445; 49/360

(56) References Cited

U.S. PATENT DOCUMENTS 3,834,081 A * 9/1974 Catlett ......................... 49/360

* cited by examiner

*Primary Examiner*—Karen Masih
(74) *Attorney, Agent, or Firm*—Browdy and Neimark, P.L.L.C.

(57) ABSTRACT

A clutch includes a moving gear member 65 being rotated integrally with a wheel at all times and engaged with a fixed gear member 69 when it is moved in a first direction and disengaged from the fixed gear member when it is moved in a second direction, an armature 61 pushing out the moving gear member 65 in the first direction when it is rotated relatively to the moving gear member 65, and an electromagnetic coil portion 60 that applies brake resistance to the armature 61 by attracting the armature 61 by magnetic force to restrict a concurrently-rotating-state of the armature 61 and the moving gear member 65.

4 Claims, 8 Drawing Sheets

POWER DEVICE FOR VEHICLE SLIDING DOOR

FIELD OF THE INVENTION

The present invention relates to a power device for a vehicle sliding door, and more particularly, to a power device for sliding a sliding door in a door-opening direction and in a door-closing direction.

DESCRIPTION OF THE RELATED ART

Conventional vehicle sliding doors may be concurrently provided with a power slide device for sliding a sliding door in a door-opening direction and in a door-closing direction by motor power, a power close device for moving the sliding door located at a half-latched position to a full-latched position by motor power, a power release device for unlatching a door latch unit of the sliding door by motor power, and the like.

FIG. 1 shows a relation among power devices used between a full-closed position and a full-open position of the sliding door, wherein when the sliding door is to be opened, first, a door latch unit of the sliding door is released (unlatched) by the power release device, and thereafter the sliding door is slid to the full-open position by the power slide device.

Further, when the sliding door is to be closed, the sliding door is slid to the half-latched position by the power slide device, and when the sliding door reaches the half-latched position, it is moved to the full-latched position by actuating the power slide device.

The power devices, in particular, the power device used as the power slide device is provided with a motor and a wire drum coupled with door-opening and door-closing cables for sliding the vehicle sliding door in the door-opening direction and in the door-closing direction, and the motor is connected to the wire drum through a clutch mechanism.

The clutch mechanism is divided broadly into a mechanical clutch mechanism and an electromagnetic clutch mechanism, and they have an advantage and a disadvantage, respectively. The mechanical clutch mechanism is basically composed of a motor as a power source, clutch pawls that are engaged with the wire drum, a cam member for moving the clutch pawls to an engagement position, and a brake member such as a spring and the like that restricts the concurrently-rotating-state of the cam member and the clutch pawl. When the motor rotates, the cam member and the clutch pawls are moved relatively with each other by the brake resistance applied by the brake member, and the clutch pawls are pushed out to the engagement position and engage with the wire drum, thereby motor power is transmitted to the wire drum. The mechanical clutch mechanism is advantageous in that the cost of electric parts can be reduced because only the motor is used as the power source. However, it takes a good amount of time to disconnect the clutch, and control becomes complicate due to the delay of disconnection particularly in a power unit used in the power slide device.

In contrast, the electromagnetic clutch mechanism is advantageous in that it can be controlled simply and can be connected and disconnected instantly.

There are many types of the electromagnetic clutch mechanisms which can be broadly classified into a friction type and a mesh type. The friction type clutch is connected by causing an armature to come into contact with a rotary plate by the magnetic force of an electromagnetic portion. The magnitude of an output that can be transmitted by the clutch depends on the magnitude of a friction coefficient between the armature and the rotary plate. Accordingly, a clutch mechanism, which is used in a power device having a large output such as the power slide device, requires a large electromagnetic coil portion that can strongly press an armature against a rotary plate so that a large friction coefficient can be obtained.

In contrast, the mesh type clutch is connected by causing a rugged portion of an armature to mesh with a rugged portion of a rotary plate. In the mesh executed between the rugged portions, the magnitude of a force for pressing the armature against the rotary plate does not substantially affect the magnitude of output that can be transmitted by the clutch. In the mesh type clutch, however, the moving distance of the armature, which is required for the armature to be meshed with the rotary plate is greatly longer than that of the armature required in the friction type clutch. Since an increase in a distance extremely lowers magnetic force, the mesh type clutch also requires a strong magnetic coil portion.

As described above, conventional electromagnetic clutch mechanisms require a strong magnetic coil portion.

SUMMARY OF THE INVENTION

Accordingly, an object of the present invention is to provide a power device having a rational clutch mechanism in which a mechanical clutch mechanism is harmonized with an electromagnetic clutch mechanism.

DESCRIPTION OF THE PREFERRED EMBODIMENTS

Figure 1:
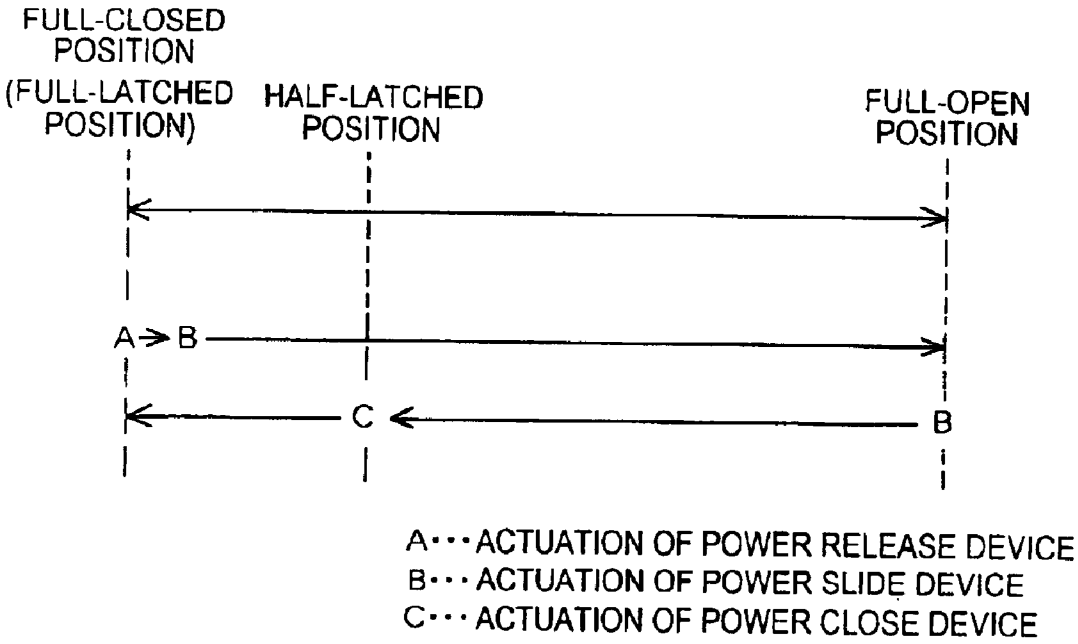
FIG. 1 is a view showing a relation between power devices used between a full-closed position and a full-open position of a conventional sliding door.
Figure 2:
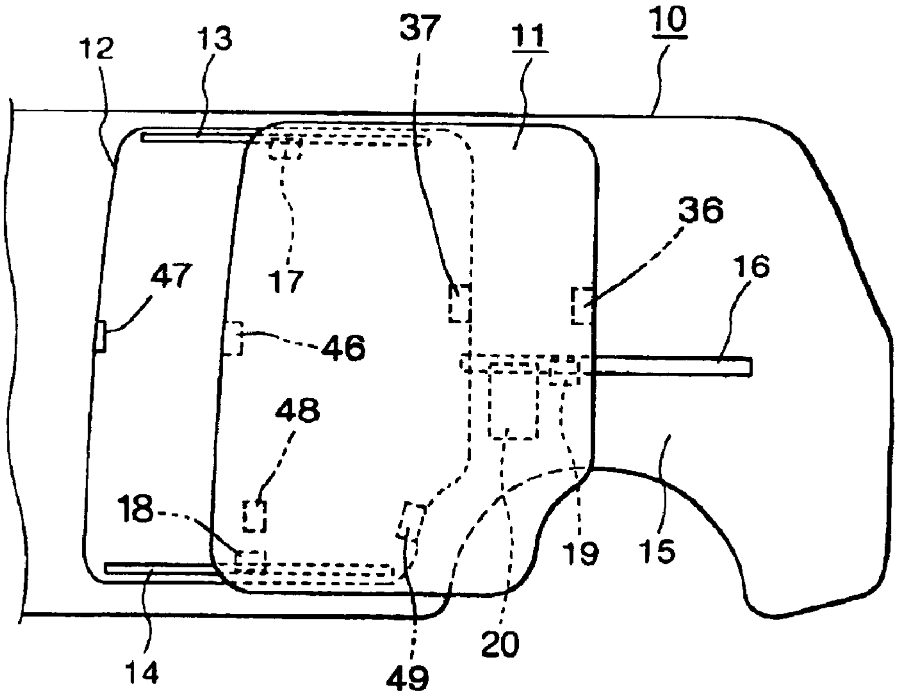
FIG. 2 is a side view of a vehicle provided with a power unit of the present invention.
Figure 3:
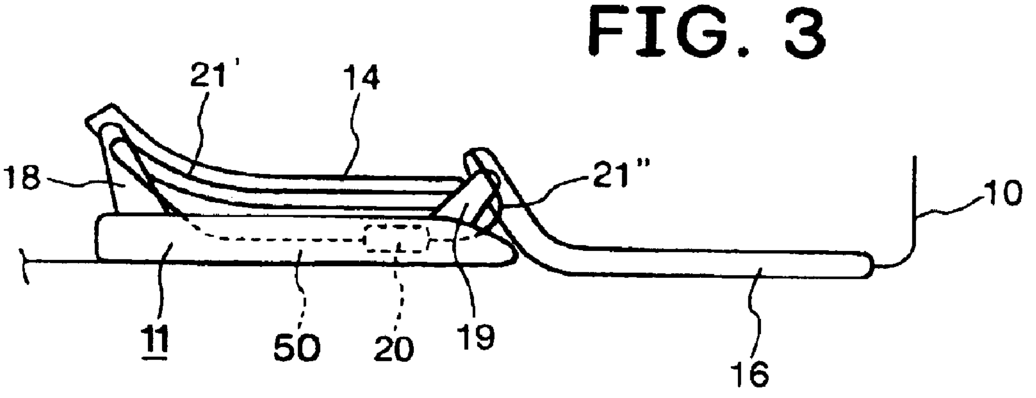
FIG. 3 is a view showing a relation between the power unit and wire cables, wherein a sliding door is closed.
Figure 4:
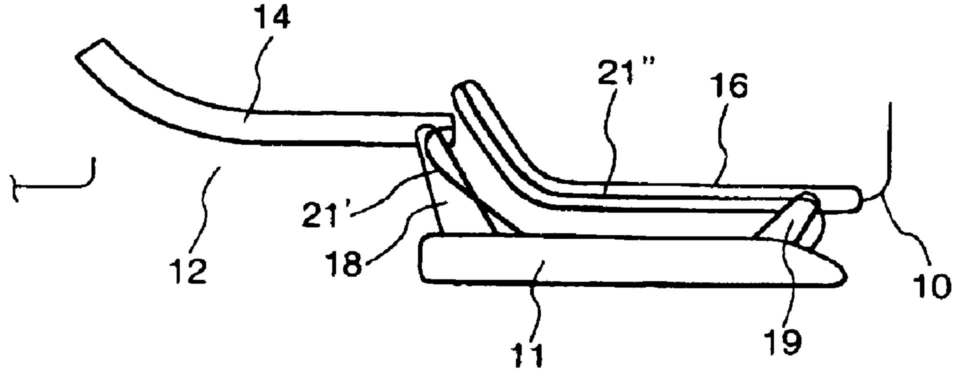
FIG. 4 is a view showing a relation between the power unit and the wire cables, wherein the sliding door is opened.
Figure 5:
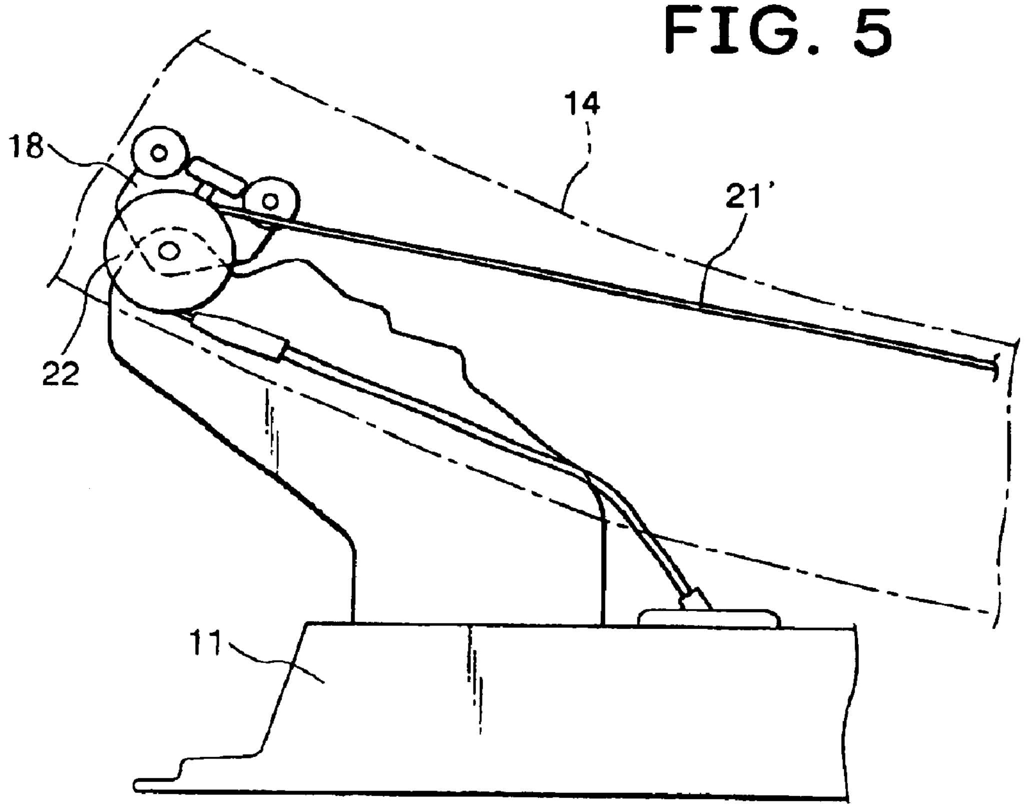
FIG. 5 is an enlarged plan view of a lower rail, and a lower roller bracket of the sliding door.
Figure 6:
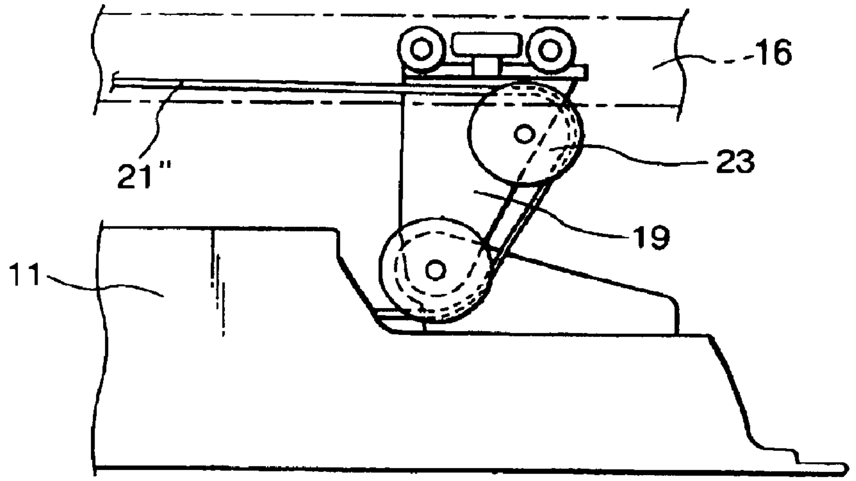
FIG. 6 is an enlarged plan view of a center rail, and a center roller bracket of the sliding door.

An embodiment of the present invention will be explained. FIG. 2 shows a vehicle body 10, a sliding door 11 slidably attached to the vehicle body 10, and a door ingress/egress aperture 12 that can be closed by the sliding door 11. An upper rail 13 is fixed to the vehicle body 10 in the vicinity of an upper portion of the door aperture 12, a lower rail 14 is fixed to the vehicle body 10 in the vicinity of a lower portion of the door aperture 12, and a center rail 16 is fixed to a quarter panel 15 that is a rear side surface of the vehicle body 10. The sliding door 11 is provided with an upper bracket 17 which is slidably engaged with the upper rail 13, a lower bracket 18 which is slidably engaged with the lower rail 14, and a center bracket 19 which is slidably engaged with the center rail 16. It is preferable that the respective brackets 17, 18, and 19 be axially fixed to the sliding door 11 so that they are free to swing, and the sliding door 11 is slidable in a door-opening direction and a door-closing direction by the engagement of these brackets with the rails.

The sliding door 11 has a power unit 20 disposed in the inner space 50 thereof, and the power unit 20 has motor power. The power unit 20 is provided with a wire drum 30 that pulls and draws out two wire cables, i.e. a door-opening cable 21' and a door-closing cable 21" which are connected to the wire drum 30 at the base ends thereof. When the wire drum 30 is rotated in the door-opening direction, the door-opening cable 21' is taken up, and the door-closing cable 21" is drawn out, and when the wire drum 30 is rotated in the door-closing direction, the door-opening cable 21' is drawn out, and the door-closing cable 21" is taken up.

The door-closing cable 21" is drawn out from a front lower position of the sliding door 11, that is, from a position in the vicinity of the lower bracket 18 toward the vehicle body (toward the lower bracket 18) to the outside of the sliding door 11. The lower bracket 18 is provided with a pulley 22 having a vertical axial center, and the door-opening cable 21' which has been drawn out from the sliding door 11, passes through a front side of the pulley 22, then extends rearward in the lower rail 14, and is fixed to a rear end of the lower rail 14 or to the vehicle body 10 in the vicinity of the rear end. With the above constitution, when the door-opening cable 21' is taken up in a door-closed state, the sliding door 11 slides rearward (in the door-opening direction) through the lower bracket 18.

The door-closing cable 21" is drawn out from the central portion in an up-and-down direction of the sliding door 11 on the rear side thereof, i.e. from a position in the vicinity of the center bracket 19 toward the vehicle body (toward the center bracket 19) to the outside of the sliding door 11. The center bracket 19 is provided with a pulley 23 having a vertical axial center, and the door-closing cable 21" which has been drawn out from the sliding door 11, passes through a rear side of the pulley 23, then extends forward in the center rail 16, and is fixed to a front end of the center rail 16 or to the vehicle body 10 in the vicinity of the front end. With the above constitution, when the door-closing cable 21" is taken up in a door open state, the sliding door 11 slides forward (in the door-closing direction) through the center bracket 19.

Figure 7:
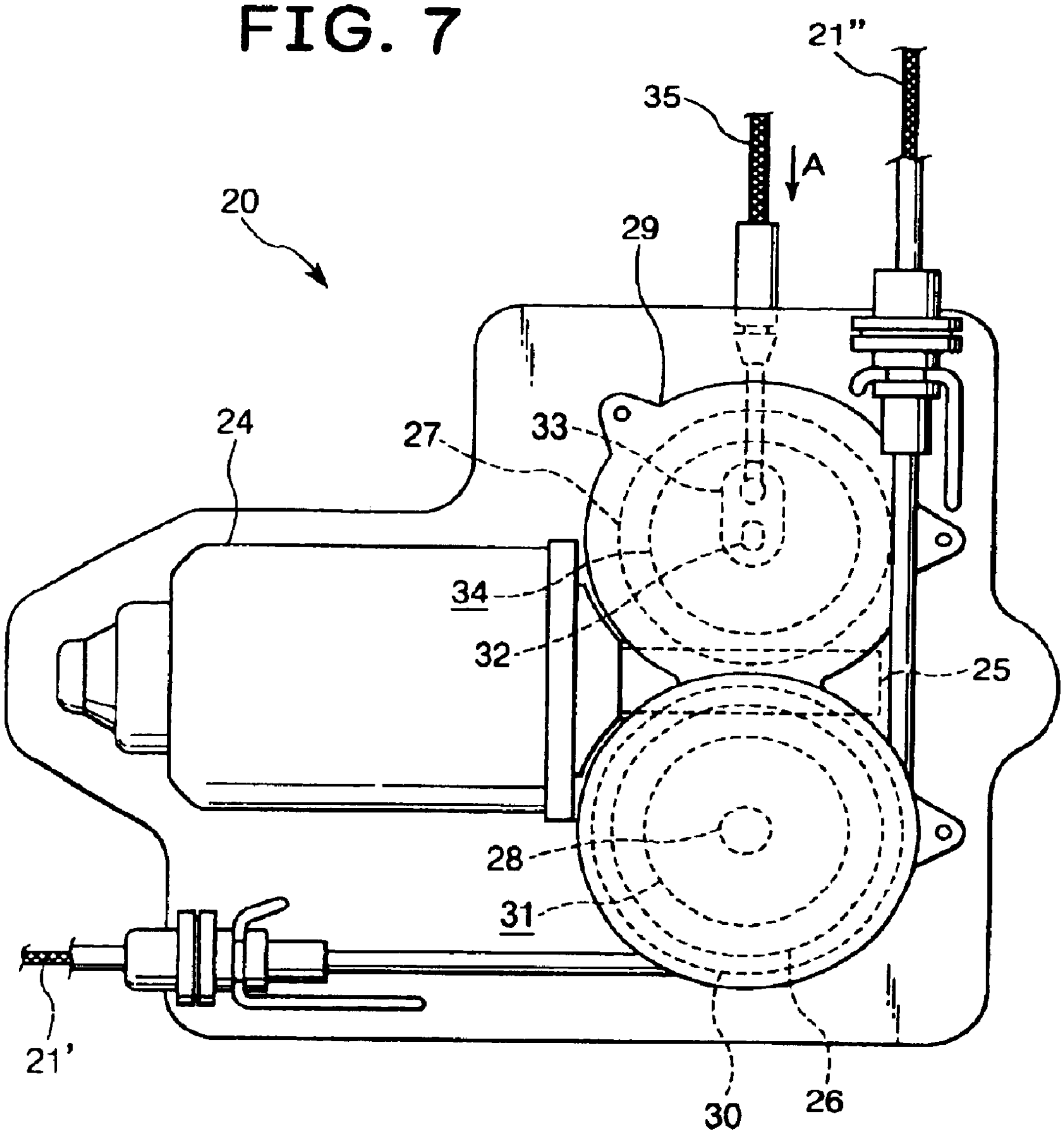
FIG. 7 is a side view of the power unit.
Figure 8:
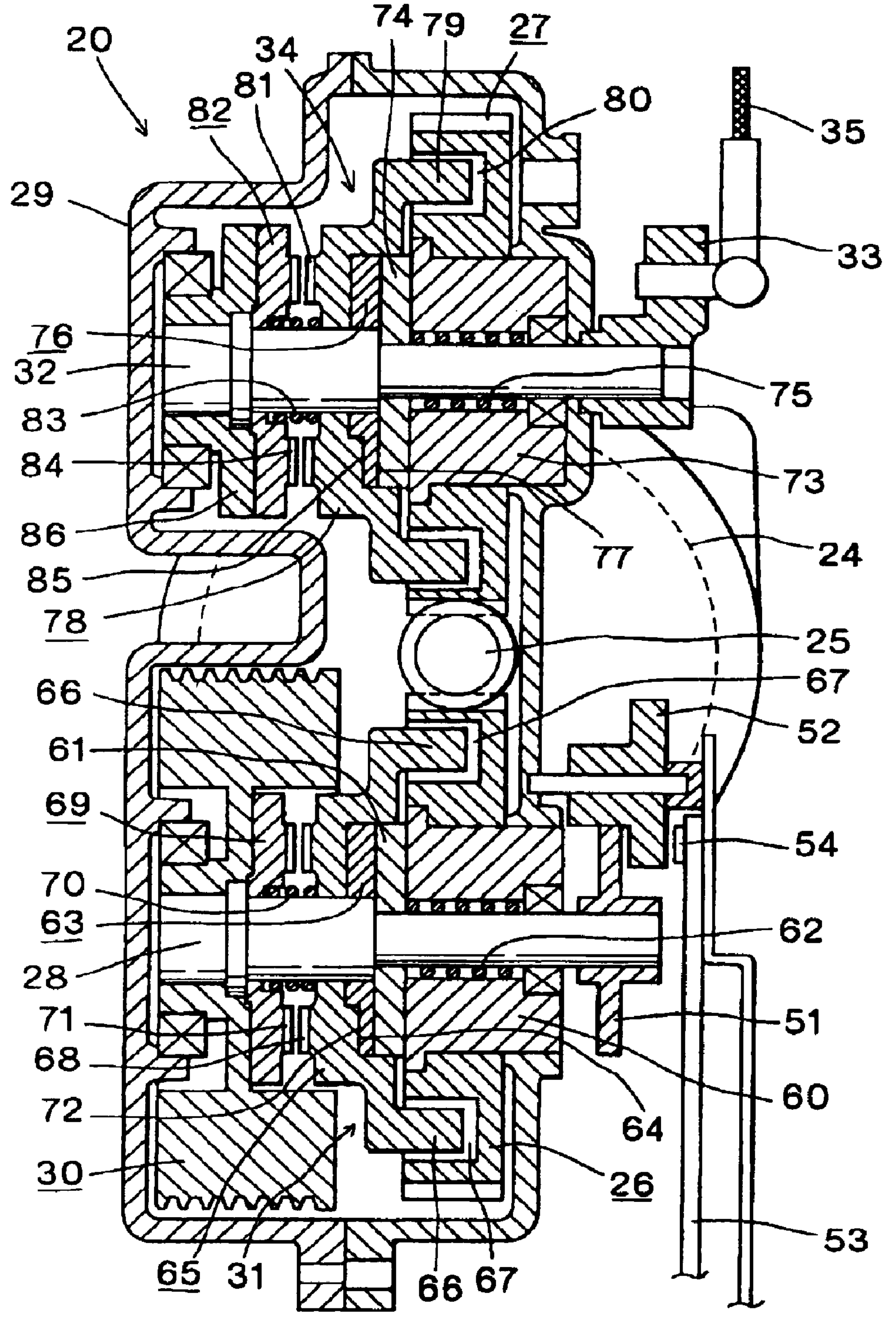
FIG. 8 is a sectional view of the power unit.

In FIGS. 7 and 8, a cylindrical worm 25 is attached to an output shaft of the high output motor 24, and first and second worm wheels 26 and 27 are provided on both the sides of the cylindrical worm 25 so that they are meshed with the cylindrical worm 25, respectively. The first worm wheel 26 is pivotally mounted on a case 29 of the power unit 20 by a first support shaft 28, and the wire drum 30 is also pivotally mounted on the first support shaft 28. A first clutch 31 is interposed between the first worm wheel 26 and the wire drum 30. When the first clutch 31 is turned on, the rotation of the first worm wheel 26 is transmitted to the wire drum 30, and when it is turned off, the wire drum 30 is placed in a free state with respect to the first worm wheel 26. Accordingly, in FIG. 7, when the first clutch 31 is turned on while the first worm wheel 26 is being rotated clockwise by the forward rotation of the motor 24, the wire drum 30 is also rotated clockwise, thereby the door-opening cable 21' is drawn out, and the door-closing cable 21" is taken up. On the contrary, when the first clutch 31 is turned on while the first worm wheel 26 is being rotated counterclockwise by the rearward rotation of the motor 24, the wire drum 30 is also rotated counterclockwise, thereby the door-opening cable 21' is taken up, and the door-closing cable 21" is drawn out. The power unit 20 has a power slide function for taking up and drawing out the door-opening cable 21' and the door-closing cable 21" by rotating the wire drum 30 by the power of the motor 24.

The second worm wheel 27 is pivotally mounted on the case 29 of the power unit 20 by a second support shaft 32. One of the ends of the second support shaft 32 is caused to pass through the case 29 and to project to the outside, and a swing arm 33 is fixed to the projecting end of the second support shaft 32. A second clutch 34 is interposed between the second worm wheel 27 and the second support shaft 32. When the second clutch 34 is turned on, the rotation of the second worm wheel 27 is transmitted to the swing arm 33 through the second support shaft 32, and when the second clutch 34 is turned off, the swing arm 33 is placed in a free state with respect to the second worm wheel 27.

Figure 10:
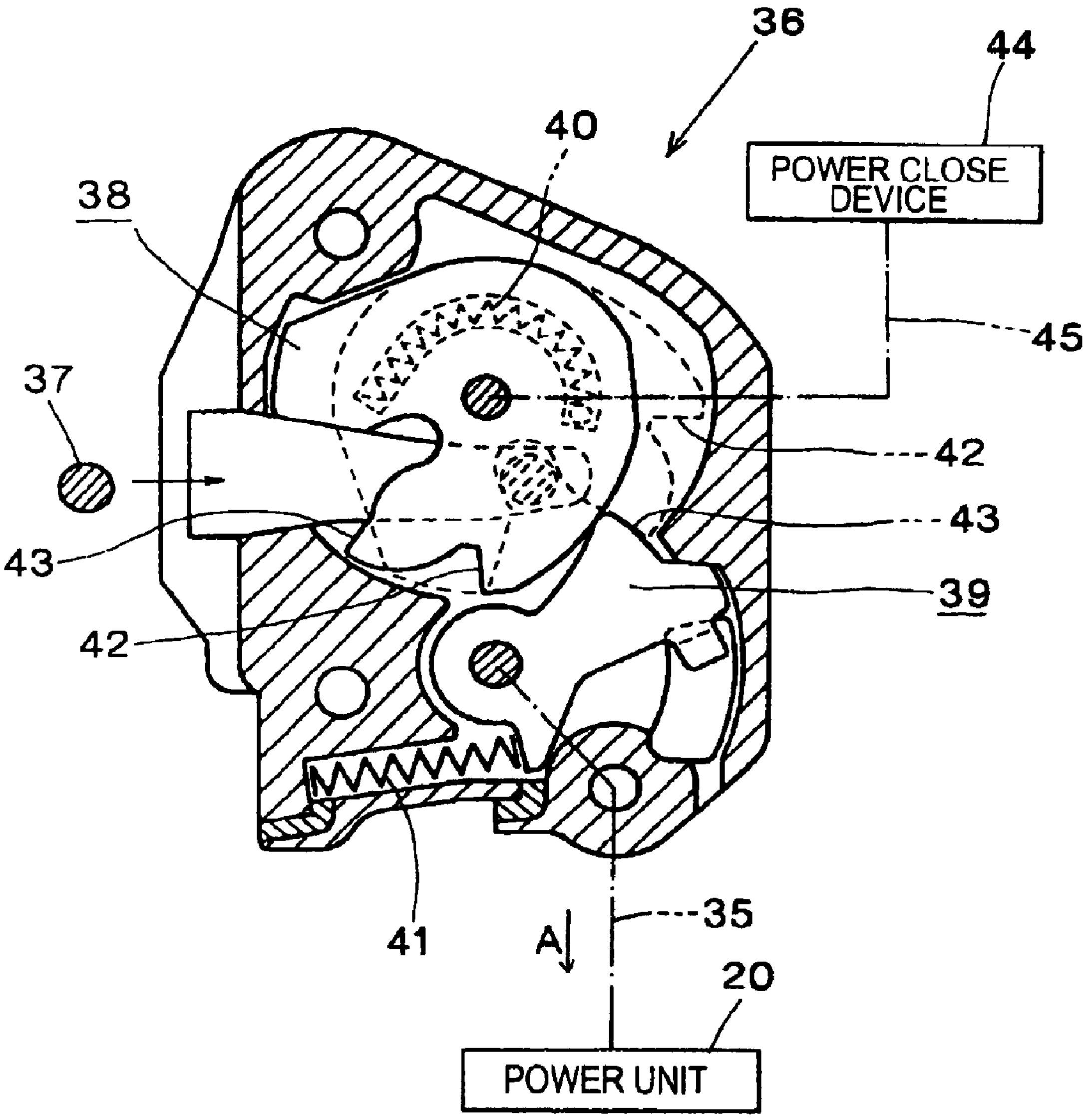
FIG. 10 is a sectional view of a door latch unit.

The swing arm 33 has a rotation end to which an end of a release cable 35 is locked. The other end of the release cable 35 is coupled with a door latch unit 36 of the sliding door 11, and when the release cable 35 is pulled in the direction of an arrow A by swinging the swing arm 33, the door latch unit 36 is released. FIG. 10 shows an example of the door latch unit 36. The door latch unit 36 includes a latch 38 which is engaged with a striker 37 fixed to the vehicle body 10, and a ratchet 39 that is engaged with the latch 38. The latch 38 is urged in a clockwise direction by the elastic force of a latch spring 40, and the ratchet 39 is urged in a counterclockwise direction by the elastic force of a ratchet spring 41. When the sliding door 11 is moved in the door-closing direction, the latch 38 is abutted against the striker 37 and rotated from a door open position (unlatched position), which is shown by a solid line, to a full-latched position (position shown by a dotted line), at which the ratchet 39 is engaged with a full-latch step 43 of the latch 38, through a half-latched position, at which the ratchet 39 is engaged with a half-latch step 42 of the ratchet 39, and when the latch 38 reaches the full-latched position, the sliding door 11 is completely closed. The release cable 35 is operatively coupled with the ratchet 39, and when the release cable 35 is pulled in the direction of the arrow A, the ratchet 39 is released from the latch 38, and the door latch unit 36 is unlatched, thereby the sliding door 11 is placed in an openable state. The power unit 20 has a power release function for unlatching the door latch unit 36 by swinging the swing arm 33 by the power of the motor 24.

Figure 11:
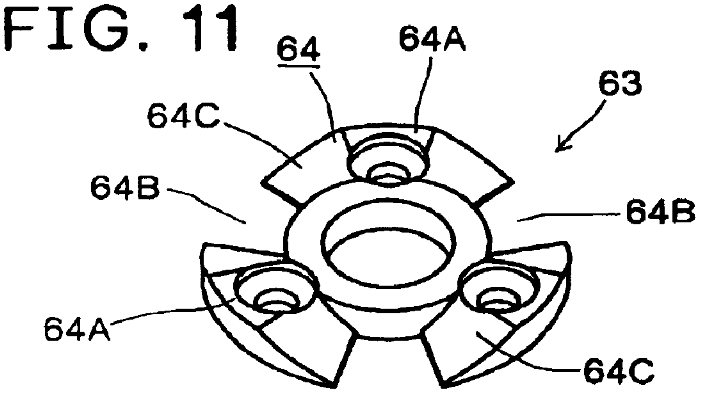
FIG. 11 is a perspective view of a cam member.

The first and second clutches 31 and 34 are clutches that are turned on and off by electric control and arranged according to the gist of the present invention. These clutches will be explained below. In FIG. 8, reference numeral 60 denotes a cylindrical electromagnetic coil portion disposed around the first support shaft 28, the electromagnetic coil portion 60 is fixed to the case 29, and the first support shaft 28 rotates independently of the electromagnetic coil portion 60. The first worm wheel 26 is rotatably supported around the outer periphery of the electromagnetic coil portion 60. An annular armature 61 is disposed on the left side of the electromagnetic coil portion 60 in the vicinity thereof and is mounted on the first support shaft 28 and is movable in the axial direction of the shaft. The armature 61 is urged leftward by the weak elastic force of a spring 62 so as to separate from the electromagnetic coil portion 60 and abutted against a step of the first support shaft 28. When the electromagnetic coil portion 60 is turned on, a right surface of the armature 61 is caused to come into intimate contact with the electromagnetic coil portion 60 by the magnetic force of the electromagnetic coil portion 60. Friction resistance generated by the intimate contact acts as brake resistance. A cam member 63 is fixed on a left surface of the armature 61. As shown in FIG. 11, a cam surface 64 of the cam member 63 is formed in an annular and regular rugged surface having apexes 64A that swell leftward in the axial direction of the first support shaft 28, bottoms 64B formed by cutouts, and slant surfaces 64C for connecting them.

Figure 12:
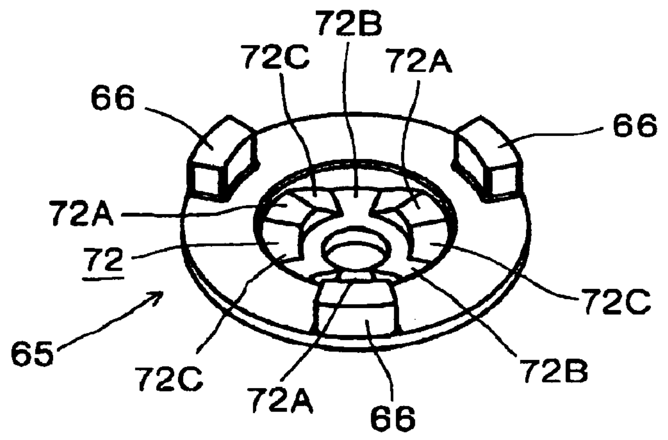
FIG. 12 is a perspective view of a moving gear member.

A moving gear member 65 (FIG. 12) is disposed on a left side of the cam member 63. The moving gear member 65 is pivotally mounted on the first support shaft 28 so that it rotates independently of the first support shaft 28 and is movable in the axial direction of the shaft, and a plurality of leg portions 66 extending rightward are formed on the outer periphery of the moving gear member 65. The right tip ends of the leg portions 66 are engaged with engagement grooves 67 of the first worm wheel 26 so that the moving gear member 65 is rotated by the rotation of the first worm wheel 26 in association therewith. The leg portions 66 are slidable with respect to the engagement grooves 67 in the axial direction of the first support shaft 28. The moving gear member 65 has an annular moving gear portion 68 disposed on the left surface thereof about the center of the first support shaft 28.

A fixed gear member 69 is disposed on the left side of the moving gear member 65, and a spring 70 which presses the moving gear member rightward, is interposed between the moving gear member 65 and the fixed gear member 69. The gear member 69 is fixed to the wire drum 30 on the left surface thereof. The wire drum 30 is fixed to the left end of the first support shaft 28 so that it rotates integrally with the first support shaft 28. The fixed gear member 69 has an annular fixed gear portion 71 disposed on the right surface thereof. When the moving gear member 65 slides leftward with respect to the first support shaft 28, the moving gear portion 68 is meshed with the fixed gear portion 71, and the rotation of the first worm wheel 26 is transmitted to the wire drum 30, and when the moving gear member 65 slides rightward with respect to the first support shaft 28, the moving gear portion 68 is released from the fixed gear portion 71, and the rotation of the first worm wheel 26 is not transmitted to the wire drum 30.

Figure 13:
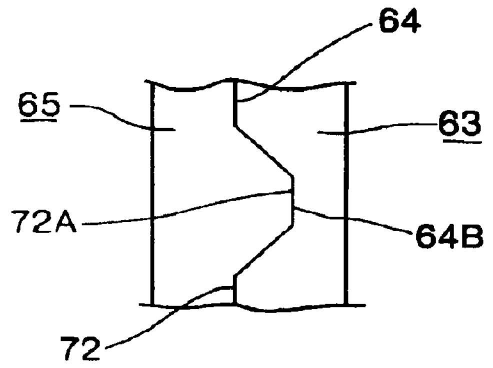
FIG. 13 is a side view showing an engagement state of a cam surface of the cam member with a cam surface of the moving gear member.
Figure 14:
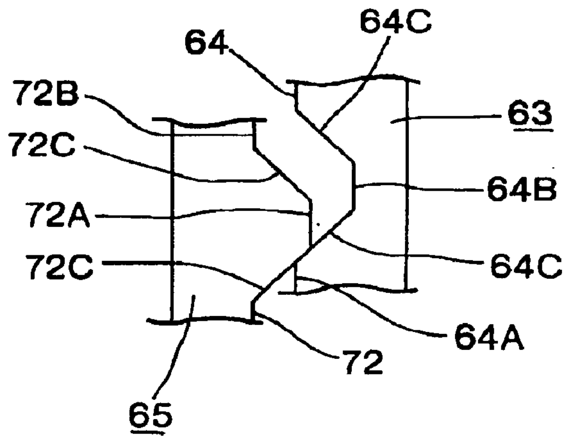
FIG. 14 is a side view showing a state that the phase of the cam surface of the cam member is different from that of the moving gear member.

The moving gear member 65 has a cam surface 72 formed thereon, and the cam surface 72 slides the moving gear member 65 leftward against the elastic force of the spring 70 in cooperation with the cam surface 64 of the cam member 63. The cam surface 72 has a symmetrical structure with respect to the cam surface 64 and is formed in an annular and regular rugged surface having apexes 72A that swell rightward in the axial direction of the first support shaft 28, bottoms 72B, and slant surfaces 72C for connecting them. As shown in FIG. 13, in a state that the apexes 72A of the cam surface 72 are in coincidence with the bottoms 64B of the cam surface 64, the moving gear member 65 is slid rightward by the elastic force of the spring 70, and the moving gear portion 68 is released from the fixed gear portion 71. When, however, the moving gear member 65 rotates about the first support shaft 28 relatively to the cam member 63, the phase of the cam surface 72 shifts from that of the cam surface 64 as shown in FIG. 14, thereby the moving gear member 65 is pushed out leftward, and the moving gear portion 68 is meshed with the fixed gear portion 71.

The second clutch 34 has the same structure as that of the first clutch 31, and includes a cylindrical magnetic coil portion 73, an annular armature 74, a spring 75, a cam member 76, a cam surface 77 of the cam member 76, a moving cam member 78, leg portions 79, engagement grooves 80, a moving gear portion 81, a fixed gear member 82, a spring 83, an annular fixed gear portion 84, and a cam surface 85 of the moving cam member 78. The fixed gear member 82 of the second clutch 34 is fixed to a receiving member 86 fixed to the left end of the second clutch 32.

The sliding door 11 has a power close device 44 attached to the inside thereof. The power close device 44 has motor power that is transmitted to the latch 38 of the door latch unit 36 through a close cable 45. In the illustrated embodiment, the power close device 44 is arranged as a device independent of the power unit 20. When the latch 38 is displaced into the half-latched position by the movement of the sliding door 11 in the door-closing direction, the power close device 44 pulls the close cable 45 and rotates the latch 38 from the half-latched-position to the full-latched position, thereby the sliding door 11 is completely closed.

The door latch unit 36 is disposed at the rear end of the sliding door 11 and achieves a function for keeping the sliding door 11 in the door-closed state in cooperation with the striker 37. The sliding door 11 may be also provided with a front latch unit 46 separately which has a latch and a ratchet similar to those of the door latch unit 36, at the front end thereof. In this case, the other end of the release cable 35 is branched, and one of the branched other ends of release cable 35 is coupled with the ratchet of the front latch unit 46 so that the latch unit 46 is also unlatched by pulling the release cable 35. Reference numeral 47 denotes a front striker which is fixed to the vehicle body 10 and with which the latch of the front latch unit 46 is engaged.

Further, the sliding door 11 may be provided with a full-open position holder 48 having a latch and ratchet. When the sliding door 11 is moved to the full-open position by being slid in the opening direction, the latch of the full-open position holder 48 is engaged with a full-open striker 49 fixed to the vehicle body and keeps the sliding door 11 at the full-open position. When the latch/ratchet type full-open position holder 48 is used, an branched end of the release cable 35 is coupled with the ratchet of the full-open position holder 48 so that the full-open position holder 48 is unlatched by pulling the release cable 35.

In FIG. 8, one of the ends of the first support shaft 28 is caused to pass through the case 29 and to project to the outside, a gear 51 is fixed to the projecting end of the first support shaft 28 and meshed with a rotary member 52. When the first support shaft 28 is rotated by the rotation of the wire drum 30, the rotary member 52 is rotated in association with the first support shaft 28. Reference numeral 53 denotes a control board of the power unit 20, and a sensor 54 which detects the amount of rotation (and rotating direction, rotating speed) of the rotary member 52, is directly mounted on the control board 53. A preferable embodiment of the rotary member 52 is a rotary member on which S- and N-pole magnetic materials are disposed circumferentially at intervals, and the sensor 54 is a hole IC sensor for detecting magnetism. Mounting the sensor 54 directly on the control board 53 is advantageous to external electric noise because no harness is necessary for the sensor 54.

Figure 9:
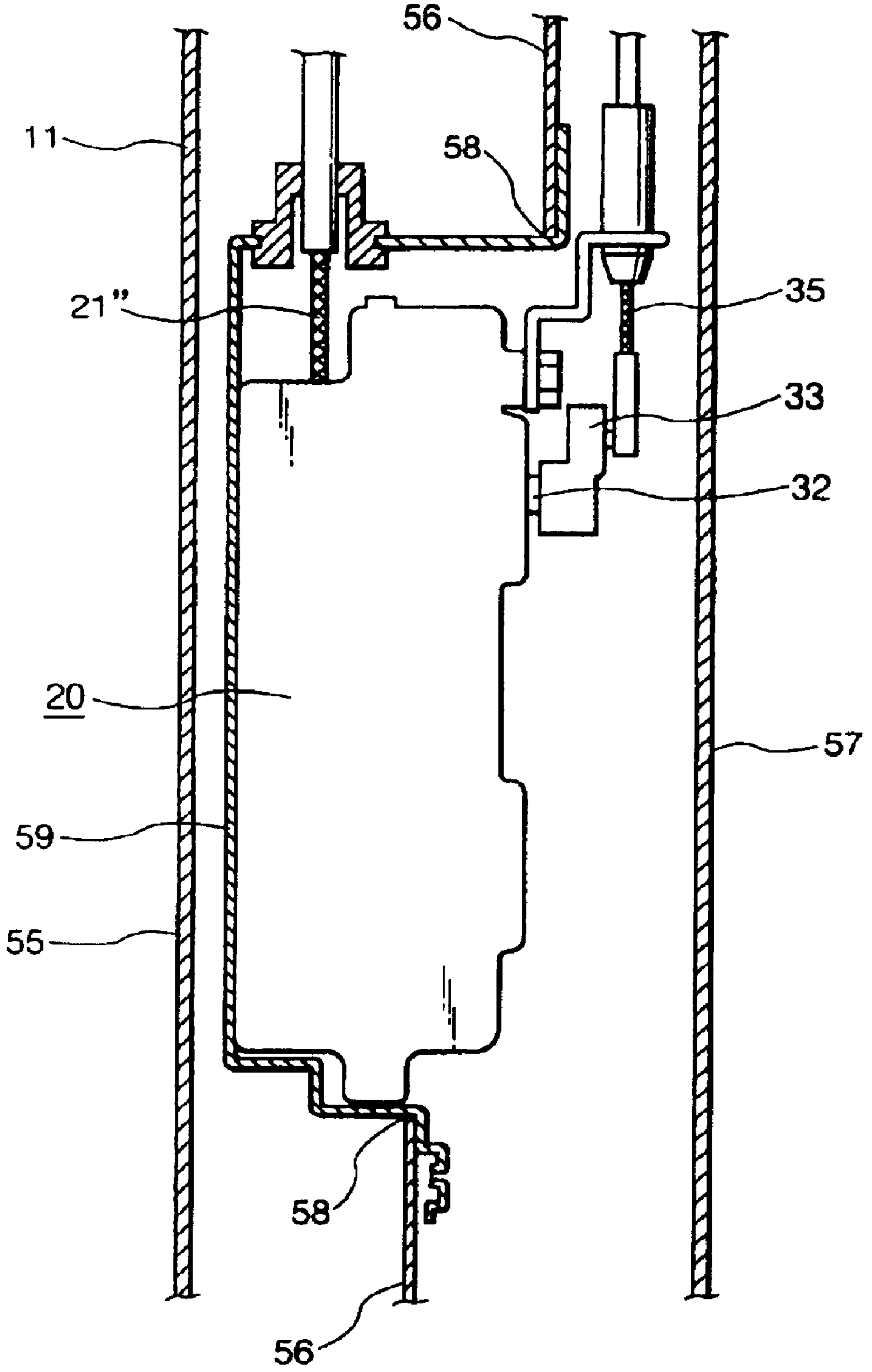
FIG. 9 is a sectional view showing a relation between the power unit and the sliding door.

As shown in FIG. 9, the sliding door 11 includes an outer metal panel 55, an inner metal panel 56, and a trim panel 57 attached to the interior surface of the inner metal panel 56. An opening 58 for mounting the power unit 20 is formed at a predetermined position of the inner metal panel 56. A mounting bracket 59 is attached to the opening 58, and the power unit 20 is fixed to the mounting bracket 59. The mounting bracket 59 has a water and dust proof structure without hole and protects the power unit 20 from rain water and dusts entering between the outer metal panel 55 and the inner metal panel 56.

The power unit 20 shown in FIGS. 7 and 8 has a power slide function and a power release function, and both the functions share the single motor 24. However, a combination of the power functions is not limited to the above combination, and a power unit, in which the power slide function is combined with a power close function, can be arranged by connecting the close cable 45 to the swing arm 33.

Operation

First, an operation of the first clutch 31 will be explained. When the cylindrical worm 25 is rotated by rotation of the motor 24, the first worm wheel 26 is rotated clockwise in FIG. 7, and the moving gear member 65 is also rotated clockwise by the engagement of the leg portions 66 with the engagement grooves 67. At the time, the moving gear member 65 is moved rightward by the elastic force of the spring 70, the moving gear portion 68 of the moving gear member 65 is, as shown in FIG. 8, released from the fixed gear portion 71 of the fixed gear member 69, and the cam surface 72 of the moving gear member 65 comes into contact with the cam surface 64 of the cam member 63 in adjacent to each other as shown in FIG. 13. Further, since the electromagnetic coil portion 60 is tuned off, no substantial friction resistance is generated between the armature 61 and the electromagnetic coil portion 60. Accordingly, the armature 61 and the cam member 63 fixed to the armature 61 are rotated together with the moving gear member 65 in a concurrently-rotating-state by the engagement of the cam surface 72 with the cam surface 64.

When the electromagnetic coil portion 60 is turned on in the above state, the armature 61 is abutted against the electromagnetic coil portion 60 by the magnetic force generated by the coil portion, and predetermined brake resistance is generated between the electromagnetic coil portion 60 and the armature 61, thereby the concurrently-rotating-state of the armature 61 and the cam member 63 is restricted, and the moving gear member 65 is rotated about the first support shaft 28 relatively to the cam member 63. Thus, the phase of the cam surface 72 is shifted from that of the cam surface 64 as shown in FIG. 14, thereby the moving gear member 65 is pushed out toward the fixed gear member 69, the moving gear portion 68 of the moving gear member 65 is engaged with the fixed gear portion 71 of the fixed gear member 69, and the rotation of the motor 24 is transmitted to the wire drum 30 through the fixed gear member 69. When the electromagnetic coil portion 60 is turned off in this state, the moving gear member 65 is moved rightward by the elastic force of the spring 70, the moving gear portion 68 of the moving gear member 65 is released from the fixed gear portion 71 of the fixed gear member 69, and the wire drum 30 becomes free with respect to the motor 24. The second clutch 34 is also actuated by the same principle.

In the above arrangement, since it is sufficient that the electromagnetic coil portion 60 attracts the armature 61 disposed in the vicinity of the electromagnetic coil portion 60 and generates the friction brake resistance that can prevent the concurrent rotation of the armature 61 and the cam member 63, an electromagnetic coil portion that is small in size can be used. Further, since the size of the electromagnetic coil portion 60 can be reduced, an arrangement, in which the first worm wheel 26 having an appropriate size is disposed around the outer periphery of the electromagnetic coil portion 60, can be established.

Next, to explain an overall operation of the power device, when the cylindrical worm 25 is reversely rotated by the common motor 24 at the time the sliding door 11 is located at the full-closed position, the first worm wheel 26 is rotated counterclockwise in FIG. 7, and the second worm wheel 27 is rotated clockwise. When the second clutch 34 is turned on in this state, the clockwise rotation of the second worm wheel 27 is transmitted to the second support shaft 32 to thereby rotate the swing arm 33 fixed to the second support shaft 32. When the swing arm 33 starts rotation, the release cable 35 is pulled a predetermined amount in the direction of the arrow A. With the above operation, the ratchet 39 of the rear latch unit 36 is rotated through the release cable 35, released from the latch 38, and unlatches the door latch unit 36. Further, when the sliding door 11 is provided with the front latch unit 46, the ratchet of the front latch unit 46 is also rotated by the release cable 35, thereby the front latch unit 46 is unlatched, and the sliding door 11 is placed in the openable state. Note that the release cable 35 is pulled the predetermined amount in the direction of the arrow A by rotating the swing arm 33 a predetermined amount less than a half-rotation. The second clutch 34 is turned off after the swing arm 33 is rotated the predetermined amount, and the swing arm 33 is returned to the state shown by FIG. 7 by a means such as a spring provided separately.

When the rear latch unit 36 (and the front latch unit 46) are unlatched, the first clutch 31 is turned on. The first clutch 31 is preferably turned on just before the second clutch 34 is turned off. When the first clutch 31 is turned on, the counterclockwise rotation of the first worm wheel 26 is transmitted to the wire drum 30 to thereby also rotate the wire drum 30 counterclockwise in the door-opening direction. Accordingly, the door-opening cable 21' is taken up and the door-closing cable 21" is pulled out, thereby the sliding door 11 is slid in the door-opening direction, and when it reaches the full-open position, the first clutch 31 is turned off, and the motor 24 is also turned off.

Since the motor 24 rotates continuously in the series of the door open operations, it can be prevented that a large load due to a motor start current continuously acts on a battery as in a conventional battery. Further, the continuous rotation of the motor permits the sliding door 11 to be smoothly slid and opened after the rear latch unit 36 (and the front latch unit 46) have been unlatched.

When the cylindrical worm 25 is rotated by the common motor 24 at the time the sliding door 11 is located at the full-open position, the first worm wheel 26 is rotated clockwise, and the second worm wheel 27 is rotated counterclockwise in FIG. 7. In this state, when the second clutch 34 is turned on, the counterclockwise rotation of the second worm wheel 27 is transmitted to the second support shaft 32 to thereby rotate the swing arm 33 fixed to the second support shaft 32. When the swing arm 33 starts rotation, the release cable 35 is pulled a predetermined amount in the direction of the arrow A. Accordingly, the ratchet of the full-open position holder 48 of the sliding door 11 is rotated through the release cable 35 and released from the latch to thereby unlatch the full-open position holder 48 so that the sliding door 11 is placed in a closable state. The second clutch 34 is turned off after the swing arm 33 is rotated the predetermined amount, and the swing arm 33 is returned to the state shown by FIG. 7 by the means such as the spring and the like provided separately. Although the swing arm 33 is rotated in a direction opposite to that of the previous time, the release cable 35 can be pulled the predetermined amount in the direction of the arrow A even if the swing arm 33 is rotated in any direction. Further, when the release cable 35 is pulled by the rotation of the swing arm 33, the ratchets of the rear and front latch units 36 and 46 are also rotated, in addition to the ratchet of the full-open position holder 48. However, since the output of the motor is sufficient to slide the sliding door 11, the output does not come short.

When the full-open position holder 48 is unlatched, the first clutch 31 is turned on. The first clutch 31 is preferably turned on just before the second clutch 34 is turned off. When the first clutch 31 is turned on, the clockwise rotation of the first worm wheel 26 is transmitted to the wire drum 30, thereby the wire drum 30 is also rotated clockwise in the door-closing direction, thereby the door-closing cable 21" is taken up, and the door-opening cable 21' is drawn out. With the above operation, the sliding door 11 is slid in the door-closing direction, and when the sliding door 11 reaches the half-latched position, the first clutch 31 is turned off, and the motor 24 is stopped as well as the power close device 44 is actuated, and thereafter the sliding door 11 is moved from the half-latched position to the full-latched position by the power close device 44.

In a series of the door close operations, the motor 24 is actuated from the full-open position to the half-latched position, and thereafter the motor of the power close device 44 is actuated. However, since a large time lag exists between the start of actuation of the motor 24 and the start of the motor of the power close device 44, no large load due to a motor start current continuously acts on the battery.

Therefore, since the respective ratchets can be released from the respective latches even if the swing arm 33, which pulls the release cable 35 in the direction of the arrow A, is rotated in any direction, the respective ratchets of the full-open position holder 48, the rear latch unit 36, and the front latch unit 46 can be released from the respective ratchets only by turning on the second clutch 34 regardless of the rotational direction of the motor 24 while it is being rotated.

Advantages

As described above, in the present invention, since the electromagnetic coil portion 60 is used for the purpose of obtaining the friction brake resistance for restricting the concurrently rotating phenomenon when the clutch is connected, a small and inexpensive electromagnetic coil portion can be used as the electromagnetic coil portion 60. Further, the overall apparatus can be simply controlled because the first clutch 31 can be connected and disconnected by turning on and off the electromagnetic coil portion 60 regardless of that the electromagnetic coil portion 60 is used to apply the brake resistance.

What is claimed is:

1. A power device for a vehicle sliding door comprising a wheel arranged to be rotated about a support shaft by motor power, a fixed gear member supported by the support shaft, and a clutch for transmitting the rotation of the wheel to the fixed gear member, wherein said clutch comprising:

- a moving gear member arranged to be rotated integrally with the wheel at all times, said moving gear member being engaged with the fixed gear member when the moving gear member is moved in a first direction and being is disengaged from the fixed gear member when the moving gear member is moved in a second direction opposite to the first direction;
- an armature for pushing out the moving gear member in the first direction when the armature is rotated relatively to the moving gear member; and
- an electromagnetic coil portion for applying brake resistance to the armature by attracting the armature by magnetic force to restrict a concurrently-rotating-state of the armature and the moving gear member.

2. A power device for a vehicle sliding door according to claim 1, wherein said wheel is rotatably mounted on an outer periphery of the electromagnetic coil portion.

3. A power device for a vehicle sliding door according to claim 1, further comprising a wire drum connected to the fixed gear member, and a door-opening cable and a door-closing cable wound around the wire drum for sliding the vehicle sliding door in a door-opening direction and in a door-closing direction.

4. A power device for a vehicle sliding door according to claim 2, further comprising a wire drum connected to the fixed gear member, and a door-opening cable and a door-closing cable wound around the wire drum for sliding the vehicle sliding door in a door-opening direction and in a door-closing direction.

* * * * *